United States Patent
Ginzburg et al.

(10) Patent No.: US 7,554,999 B2
(45) Date of Patent: Jun. 30, 2009

(54) COMPACT MEDIUM ACCESS CONTROL (MAC) LAYER

(75) Inventors: Boris Ginzburg, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 11/169,366

(22) Filed: Jun. 28, 2005

(65) Prior Publication Data

US 2006/0291494 A1   Dec. 28, 2006

(51) Int. Cl.
H04L 12/28 (2006.01)
(52) U.S. Cl. .................................... 370/412
(58) Field of Classification Search .......... 370/336–338
See application file for complete search history.

(56) References Cited

U.S. PATENT DOCUMENTS

| | | | |
|---|---|---|---|
| 6,850,540 | B1 | 2/2005 | Peisa et al. |
| 2004/0120284 | A1 | 6/2004 | Terry et al. |
| 2004/0264475 | A1 | 12/2004 | Kowalski |
| 2004/0264488 | A1 | 12/2004 | Yoon et al. |
| 2006/0034247 | A1* | 2/2006 | Gu et al. ................ 370/349 |
| 2006/0045051 | A1* | 3/2006 | Floros et al. ............ 370/332 |
| 2006/0062189 | A1* | 3/2006 | Takeuchi ................ 370/338 |
| 2007/0195787 | A1* | 8/2007 | Alnuweiri et al. ...... 370/395.4 |
| 2008/0095124 | A1* | 4/2008 | Ramos et al. .......... 370/336 |

* cited by examiner

*Primary Examiner*—Chirag G Shah
*Assistant Examiner*—Otis L Thompson, Jr.
(74) *Attorney, Agent, or Firm*—Schwabe, Williamson & Wyatt, P.C.

(57) ABSTRACT

Electronic devices having compactly designed media access control (MAC) layers, that can be employed as nodes in a wireless network such as an Institute of Electrical and Electronic Engineers' (IEEE) 802.11 wireless local area network (WLAN) are described herein.

18 Claims, 4 Drawing Sheets

COMPACT MEDIUM ACCESS CONTROL (MAC) LAYER

TECHNICAL FIELD

Embodiments of the invention relate generally to the field of electronic devices, and more particularly, to the medium access control (MAC) layers of electronic devices that may be employed in a wireless local area network (WLAN).

BACKGROUND

Wireless local area networks (WLAN) are becoming prevalent in many environments. To facilitate implementation of WLAN, the Institute of Electrical and Electronic Engineers (IEEE) has developed standards and protocols for such networks. These standards are commonly referred to as the IEEE 802.11 standards (802.11a, 802.11b, and so forth). To improve Quality of Service (QoS) for different applications working over Wireless LAN, including voice and video transmission, the 802.11e standard has been developed.

An 802.11 WLAN network is typically made up of a group of nodes forming a cell called Basic Service Set (BSS). A node may be an access point (AP) or a station (STA). When the WLAN is operating under the 802.11e standard, the access point (AP) and the station (STA) are typically referred to as QAP and QSTA. A QAP is usually physically coupled to a wired network such as a local area network (LAN). The QAP within an 802.11e WLAN cell will further be in wireless communication with one or more STAs. In such a cell, there is typically only a single wireless medium or channel (e.g., band) that can be used for communicating between the nodes.

The IEEE 802.11e standard is a protocol that defines methods to provide QoS service over WLAN for variety of applications including video- and audio-type applications. Further, the 802.11e standard is based on two primary mechanisms for channel access.

The first mechanism is the Enhanced Distributed Channel Access (EDCA) protocol, which is a contention-based mechanism employing a contention window (CW) method with random backoff to determine which node within a cell has the right to transmit signals. That is, when EDCA is employed, the various nodes of a cell will compete during a specific time period (i.e., contention window) to determine which node(s) is/are permitted to transmit signals.

The second mechanism is the Hybrid Coordination Function (HCF) Controlled Channel Access (HCCA) protocol, which originates from the legacy Point Coordination Function (PCF). The HCCA mechanism is basically a polling-based protocol whereby a QAP polls each QSTA within its cell whether or not each of the QSTAs wishes to transmit data (signals) and if so, to allocate an increment of time to transmit the data. The time period assigned to a node for transmitting data (i.e., signals) may be referred to as the "transmission opportunity" (TxOP).

Prior art nodes have resorted to complicated and/or inefficient architectures to concurrently support the two mechanisms (EDCA and HCCA).

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Illustrative embodiments of the present invention include compact architecture for Media Access Controller for electronic devices that may be employed in wireless environments such as a WLAN employing the 802.11e standard.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

Figure 1:
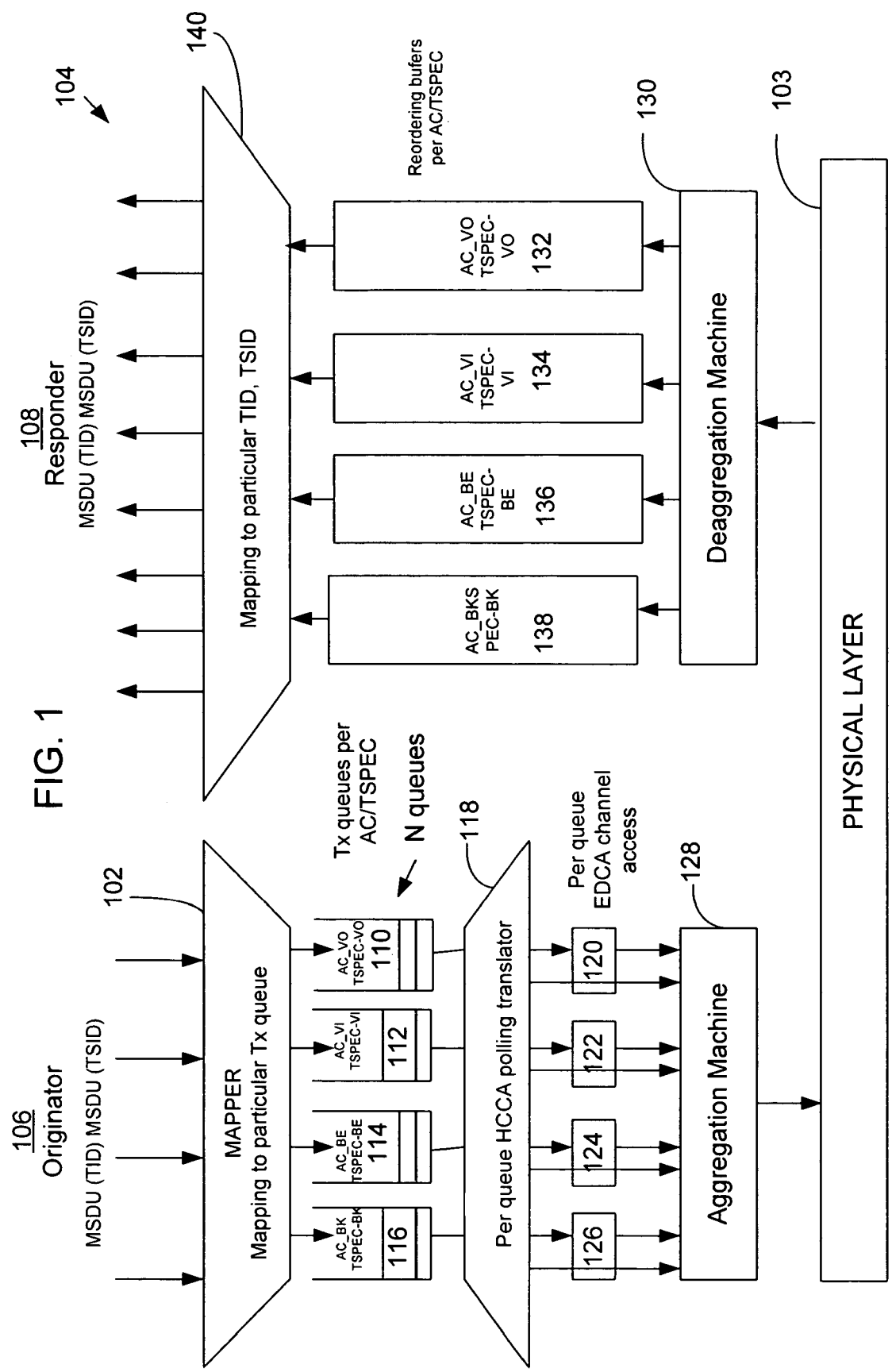
FIG. 1 illustrates a portion of a compactly designed medium access control (MAC) layer of an electronic device, in accordance with some embodiments.

FIG. 1 depicts a portion of a more compactly designed medium access control (MAC) layer of an electronic device, in accordance with some embodiments. For purposes of this description, the compactly designed MAC layer may be referred to as Compact Distributed Channel Access (CDCA) MAC layer. The electronic device, which may communicate wirelessly or through a wired or optical medium, may be employed as a node (either QAP or QSTA) of a WLAN employing the 802.11e standard. In some embodiments, the electronic device may be a wireless device. In particular, FIG. 1 shows an originator 106 of the MAC layer 104 of the electronic device, the originator 106 being the originator of traffic stream. FIG. 1 also depicts a responder 108, which too will be discussed below. The MAC layer 104 may be above a physical (PHY) layer 103. In various embodiments, the originator 106 has a reduced number of transmission queues ("queues") relative to prior art originators. As briefly described above, at least a portion of the MAC layer 104 may include both an originator 106 and a responder 108; however, the following discussion relating to the various embodiments of the invention will focus primarily on the design of the originator 106.

On the originator side of the MAC layer 104, MAC service data units (MSDUs) that include either traffic ID (TID) or traffic service ID (TSID) data depending on whether the MSDU is designated for EDCA or HCCA transmission protocol may be received from an external source such as another architectural layer (e.g., network layer) and initially received by a mapper 102, which may be part of the MAC layer 104. The mapper 102 may receive the MSDUs and map the MSDUs to specific transmission queues ("queues" or "Tx queues") 110 to 116. However, unlike prior art originators, all packets of the same user priority (UP) may use the same Channel Access Method such as HCCA or EDCA. This allows for a significant reduction in the number of Tx queues. Note that in other embodiments, there may be fewer or more queues. The number (N) of queues 110 to 116 in this illustration corresponds to the number of access categories associated with the electronic device (e.g., node of a WLAN). In this case, the access categories includes voice, video, best effort, and background. Each of these queues 110 to 116 may be further configured for traffic specification (TSPEC) thus accommodating MSDUs designated for either EDCA or HCCA transmission protocols. This may allow the originator 106 to maintain fewer queues than typical prior art originators. As described before, each of the queues 110 to 116 may store MSDUs designated for EDCA or HCCA transmission protocols.

For purposes of this description, the number of queues that accommodates MSDUs to be transmitted using a first transmission protocol (e.g., EDCA transmission protocol) may be referred to as $n_1$ while the number of queues that accommodates MSDUs to be transmitted using a second transmission protocol (e.g., HCCA transmission protocol) may be referred to as $n_2$. Of course, it is possible that in other embodiments, there may be one or more transmission queues that accommodates MSDUs to be transmitted using a third, a fourth, and the like, transmission protocols (e.g., $n_3$, $n_4$, and so fourth).

Figure 2:
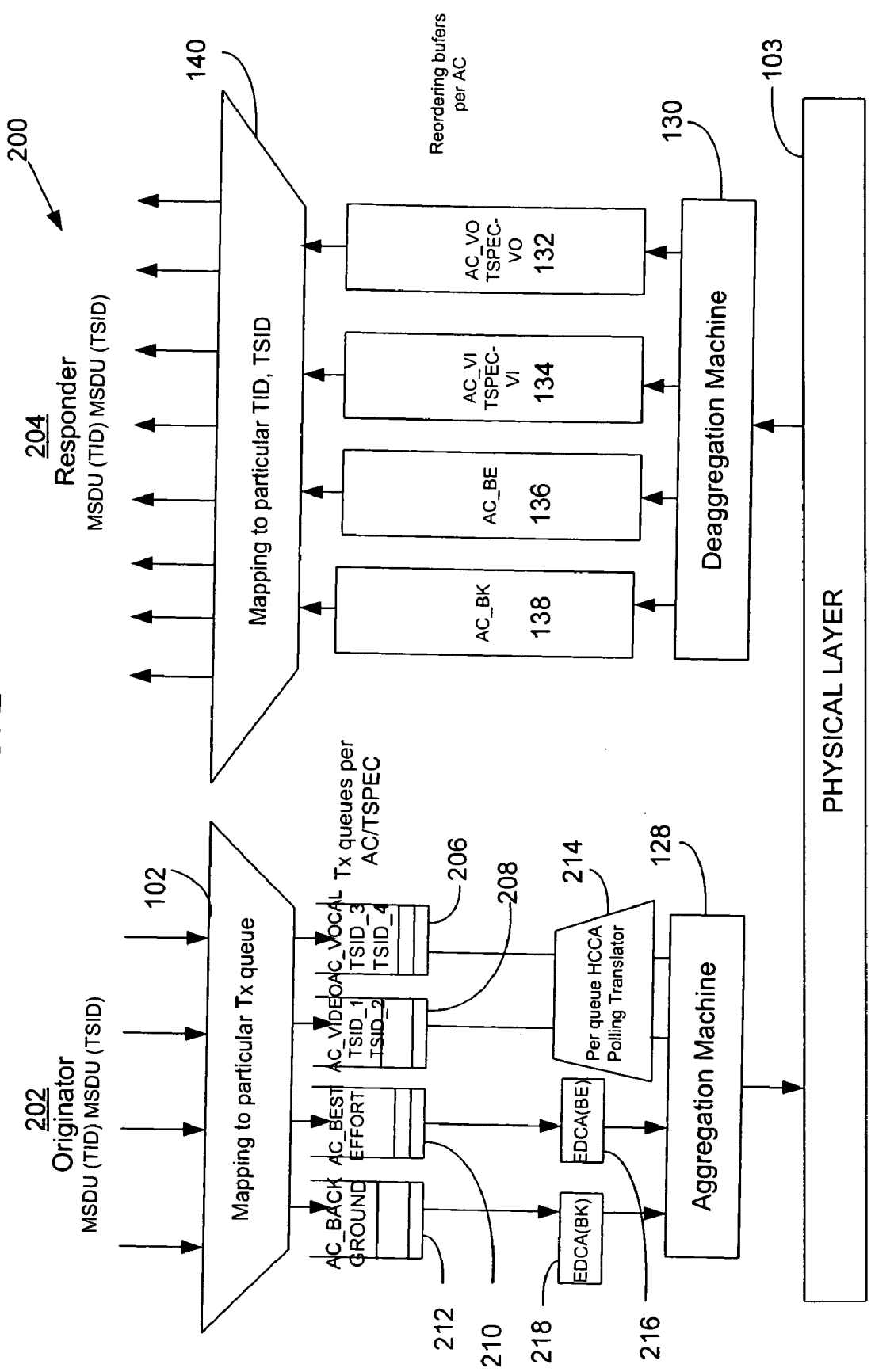
FIG. 2 illustrates a portion of a compactly designed medium access control (MAC) layer of an electronic device, in accordance with some other embodiments.
Figure 3:
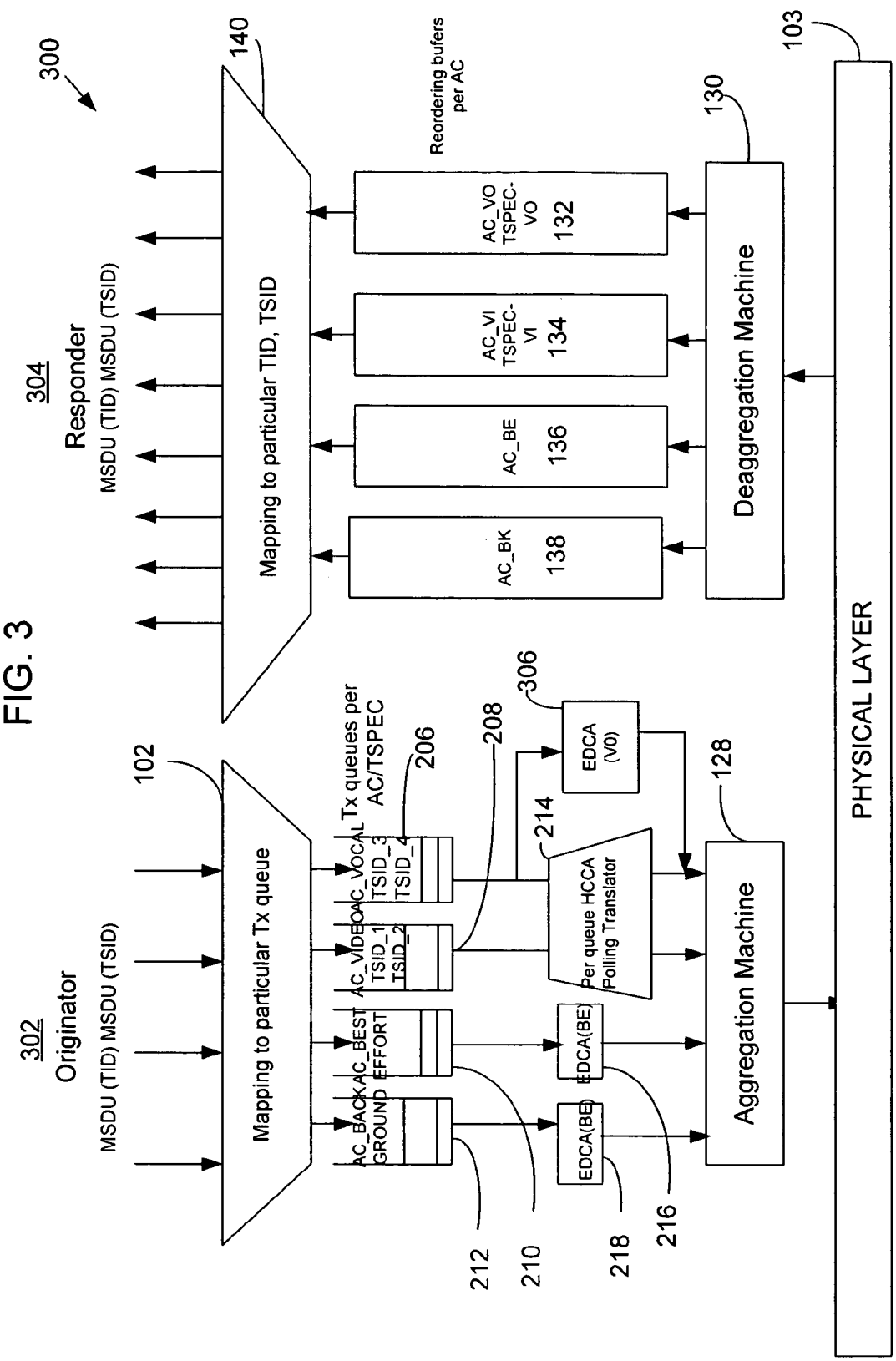
FIG. 3 illustrates a portion of a compactly designed medium access control (MAC) layer, in accordance with still some other embodiments.

According to some embodiments, the four queues 110 to 116 may be communicatively coupled to a first channel access control unit 118 (note that in other embodiments, the queues 110 to 116 may be coupled to more than a single channel access control unit—see FIGS. 2 and 3, for example), which in this case, is "per queue HCCA polling translator." The four queues 110 to 116 may be further communicatively coupled indirectly through the first channel access control unit 118 to second channel access control units 120 to 126.

In this case, the first channel access control unit 118 may control an MSDU's access to a first wireless channel that may be based on HCCA protocol while the second channel access control units 120 to 126 may control an MSDU's access to a second wireless channel based on EDCA protocol. Once an MSDU is directed by a first and/or a second channel access control unit[s] to get access to a first or a second channel, the MSDU is passed to an aggregation machine 128 which may aggregate a number of frames into a block of frames. Then the block of frames may be transmitted to the physical (PHY) layer 103. As a result of the originator configuration described above, block acknowledgements (BAs) may be defined per transmission queues, thus allowing maintenance of single sequencing number and single reordering buffer per queue accordingly to block acknowledgement rules.

As for the responder 108 of the MAC layer 104 depicted in FIG. 1, for the embodiments, the responder configuration includes a deaggregation machine 130, a plurality of buffers 132 to 138, and a mapper 140, similar to other conventional responders. Thus, no further discussion will be presented. Likewise, in the following discussion of the two other embodiments depicted in FIGS. 2 and 3, the responder of the compactly designed MAC layer 200 and 300 are also conventionally constituted. However, in alternate embodiments, the responder may also be more compactly designed as the originator. The responder 108 may receive various data in the form of electronic signals from other electronic devices (e.g., QSTAs and QAP of a WLAN) including, for example, individual acknowledgements and block acknowledgements (BAs) transmitted by the other electronic devices.

FIG. 2 depicts at least a portion of a compactly designed MAC layer of an electronic device in accordance with some embodiments. Again, as with the electronic device of FIG. 1, the electronic device in this illustration may be employed as a node (either QAP or QSTA) of a WLAN employing the 802.11e standard. The MAC layer 200 may include an originator 202 and a responder 204 (the responder here has the same configuration as the responder 108 of FIG. 1). As before, the originator 202 may receive MSDUs (TID or TSID) from an external source such as the network layer. When the MSDUs arrive at the MAC layer 200, they may be initially received by a mapper 102, which maps the MSDUs to one or more transmission queues 206 to 212.

As in the case before (i.e., FIG. 1), there are four transmission queues ("queues") 206 to 212 that may be associated with four access categories (ACs), vocal, video, best effort, and background. Further, the queues 206 to 212 may be communicatively coupled to channel access control units 214 to 218. However, unlike the originator 106 depicted in FIG. 1, only two of the queues 206 and 208 may store MSDUs designated for transmission under the HCCA protocol (as indicated by TSID_x) while the other two queues 210 and 212 may store MSDUs designated for transmission under the EDCA protocol. As a result, unlike the originator 106 of FIG. 1, only the first two queues 206 and 208, which may accommodate vocal and video MSDUs, are communicatively coupled only to the first channel access control unit 214 ($n_1$=2, as defined here, $n_x$ refers to the number of queues coupled to specific channel access control unit[s] dedicated to protocol "x"). The other two queues 210 and 212, which accommodate best effort and background MSDUs are directly communicatively coupled to the second channel access control units 216 and 218 ($n_2$=2). Again, as in the previous originator 106 depicted in FIG. 1, the first channel access control unit 214 may be the "per queue HCCA polling translator." However, unlike the originator 106 depicted in FIG. 1, the first channel access control unit 214 may not be coupled in series to second channel access control units 216 and 218. Instead, as described above, the second channel access control units 216 and 218 may be directly communicatively coupled to the other two queues 210 and 212.

Similar in some aspects to the originator 106 of FIG. 1, the first and second channel access control units 214 to 218 may control an MSDU's access to a first and/or a second channel. The first and second access control units 214 to 218 are further communicatively coupled to an aggregation machine 128. The MSDUs traveling through the originator 202 may be directed by the first and second access control units 214 to 218 to the aggregation machine 128 where frames may be aggregated to form one or more blocks. The aggregation machine 128 is further communicatively coupled to the physical (PHY) layer 103. When appropriate, the one or more transmission blocks that may be formed by the aggregation machine 128 may be sent to the PHY layer 103.

FIG. 3 depicts at least a portion of a compactly designed MAC layer 300 of an electronic device in accordance with some embodiments. Again, as with the electronic devices of FIGS. 1 and 2, the electronic device in this illustration may be employed as a node (either QAP or QSTA) of an 802.11e WLAN. For the embodiments, FIG. 3 depicts a responder 304 similar to the responders 108 and 204 of FIGS. 1 and 2. The originator 302 depicted here, on the other hand, although similar to the originator 202 depicted in FIG. 2, is configured slightly different. That is, in addition to having a similar configuration and components, the originator 302, in this case, includes an extra second channel access control unit 306 that is communicatively coupled to the transmission queue 206 that may store vocal MSDUs. The extra second channel access control unit 306 further bypasses the first channel access control unit 214 and is in direct communication with the aggregation machine 128. This allows a voice MSDU stored in the transmission queue 206 to be transmitted via HCCA or EDCA protocols. Transmission via EDCA protocol instead of the HCCA protocol via the second channel access control unit 306 may occur, for example, in the case of a missed QoS-poll.

Figure 4:
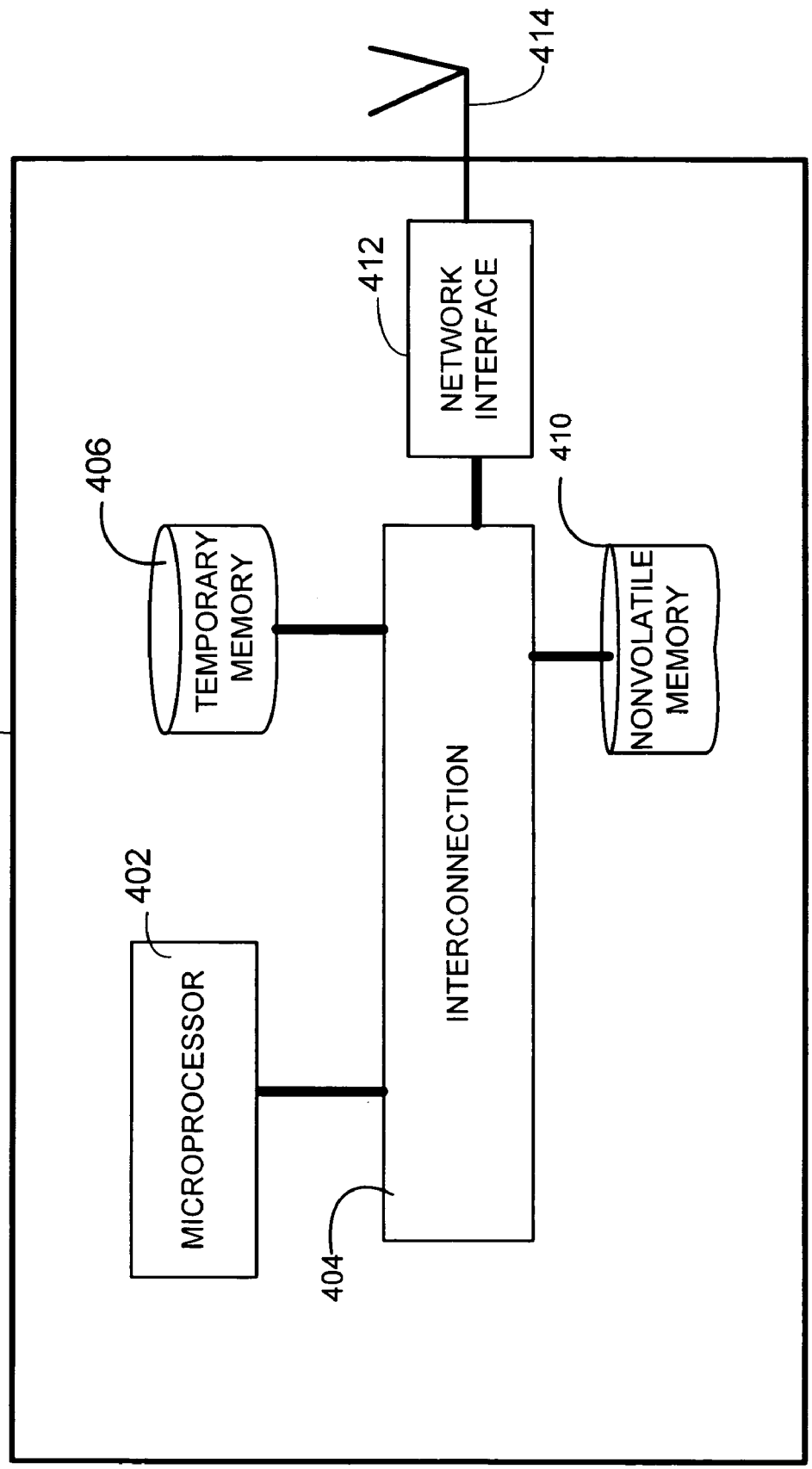
FIG. 4 is a block diagram of an example node, incorporated with the teachings of the invention, in accordance with some embodiments.

FIG. 4 depicts a system having a compactly designed MAC layer that includes an originator and/or a responder such as those described above. In various embodiments, the system 400 may include a microprocessor 402, an interconnection 404 such as a bus, temporary memory 406 including, for example, SRAM and DRAM, a nonvolatile memory 410, a network interface 412, and an antenna 414. The compactly designed MAC layer that includes an originator and/or responder described above may be embodied in the network interface 412. The network interface 412 and antenna 414 may be used to communicate with other nodes of a wireless network such as an 802.11 wireless local area network (WLAN).

In various embodiments, the antenna 414 may be a substantially omnidirectional antenna. In yet other embodiments, one or more substantially omnidirectional antenna(e) may be employed instead of the single antenna 414 depicted in FIG. 4. When multiple antennae are used, they may be used such that the system 400 has multiple input multiple output (MIMO) capabilities.

Accordingly, a compactly designed MAC layer suitable for use in electronic devices of a WLAN has been described. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those of ordinary skill in the art will readily appreciate that the present invention may be implemented in a very wide variety of embodiments. This description therefore is intended to be regarded as illustrative instead of restrictive on embodiments of the present invention.

What is claimed is:

1. An apparatus, comprising:
   N queues to store MAC service data units (MSDUs), where N is an integer and each of the N queues is configured to store MSDUs of a respective access category, wherein N equals a number of access categories supported by the apparatus;
   a mapper coupled to the N queues to map and store MSDUs into the N queues;
   one or more enhanced distributed channel access (EDCA) control units coupled to $n_1$ of the N queues to access one or more channels for the MSDUs stored in the $n_1$ queue(s), for transmission in accordance with an EDCA transmission protocol, where $n_1$ is an integer smaller or equal to N; and
   one or more hybrid coordination function (HCF) controlled channel access (HCCA) control units coupled to $n_2$ of N queues to access one or more channels for the MSDUs stored in the $n_2$ queue(s), for transmission in accordance with an HCCA transmission protocol, where $n_2$ is equal to N, and at least a first of the N queues is a member of the $n_1$ queue(s), as well as a member of the $n_2$ queue(s).

2. The apparatus of claim 1, wherein $n_1$ equals N.

3. The apparatus of claim 2, where $n_1$ and N both equal 4.

4. The apparatus of claim 3, where $n_2$ and N both equal 4.

5. The apparatus of claim 1, wherein the mapper is further designed to map and store video medium access control (MAC) service data units (MSDUs) in a second of the N queues, that is a member of the $n_1$ queue, as well as a member of the $n_2$ queue.

6. The apparatus of claim 1, wherein the mapper is designed to map and store voice medium access control (MAC) service data units (MSDUs) in said first of the N queues, that is a member of the $n_1$ queue, as well as a member of the $n_2$ queue.

7. An apparatus, comprising:
   N queues, with each of the N queues configured to store MAC service data units (MSDUs) of a respective access category, where N is an integer, equal to a number of access categories supported by the apparatus;
   a mapper coupled to the N queues, to map and store MSDUs into the N queues;
   $n_1$ enhanced distributed channel access (EDCA) control unit[s] coupled to $n_1$ of the N queues to access channels for MSDUs stored in the $n_1$ queues, for transmission in accordance with an EDCA transmission protocol, where $n_1$ is an integer, smaller than or equal to N; and
   a hybrid coordination function (HCF) controlled channel access (HCCA) control unit coupled to $n_2$ of the N queues to access channels for MSDUs stored in the $n_2$ queues, for transmission in accordance with an HCCA transmission protocol, where $n_2$ is equal to N.

8. The apparatus of claim 7, wherein $n_1$ equals N.

9. The apparatus of claim 7, wherein $n_1$ and N both equal 4.

10. The apparatus of claim 7, wherein $n_2$ and N both equal 4.

11. The apparatus of claim 10, wherein a first of the N queues is a member of the $n_1$ queue(s), as well as a member of the $n_2$ queue(s) and the mapper is further designed to map and store video medium access control (MAC) service data units (MSDUs) in a second of the N queues that is a member of the $n_1$ queue(s), as well as a member of the $n_2$ queue(s).

12. The apparatus of claim 7, wherein the mapper is designed to map and store voice medium access control (MAC) service data units (MSDUs) in a first of the N queues that is a member of the $n_1$ queue(s), as well as a member of the $n_2$ queue(s).

13. A method comprising:
   mapping and storing, by a mapper, a first medium access control (MAC) service data unit (MSDU) into a first queue of a MAC layer;
   first determining whether a first channel is available for transmission of the first MSDU stored in the first queue, in accordance with a first transmission protocol;
   second determining whether a second channel is available for transmission of the first MSDU stored in the first queue, in accordance with a second transmission protocol; and conditionally outputting the first MSDU from the first queue to a physical layer for transmission, based at least in part on the results of said first and second determining;
   mapping and storing, by the mapper, a second medium access control (MAC) service data unit (MSDU) into a second queue of the MAC layer;
   third determining whether a third channel is available for transmission of the second MSDU stored in the second queue, in accordance with the first transmission protocol; and conditionally outputting the second MSDU from the second queue to physical layer for transmission, based at least in part on the results of said third determining.

14. The method of claim of claim 13, further comprising receiving an acknowledgement in response to the outputted first medium access control (MAC) service data unit (MSDU).

15. A method comprising:
mapping and storing, by a mapper, a first medium access control (MAC) service data unit (MSDU) into a first queue of a MAC layer;
first determining whether a first channel is available for transmission of the first MSDU stored in the first queue, in accordance with a first transmission protocol;
second determining whether a second channel is available for transmission of the first MSDU stored in the first queue, in accordance with a second transmission protocol; and conditionally outputting the first MSDU from the first queue to a physical layer for transmission, based at least in part on the results of said first and second determining;
mapping and storing, by the mapper, a second medium access control (MAC) service data unit (MSDU) into a second queue of the MAC layer;
third determining whether a third channel is available for transmission of the second MSDU stored in the second queue, in accordance with the second transmission protocol; and
conditionally outputting the second MSDU from the second MSDU queue to the physical layer for transmission, based at least in part on the result of said third determining.

16. A system, comprising:
a network interface having a medium access control (MAC) layer including
N queues to store MAC service data units (MSDUs), where N is an integer and each of the N queues is configured to store MSDUs of a respective access category, wherein N equals a number of access categories supported by the apparatus,
a mapper coupled to the N queues, to map and store the MSDUs into the N queues,
$n_1$ enhanced distributed channel access (EDCA) control unit(s) coupled to $n_1$ of the N queues to correspondingly access channel(s) for the MSDUs stored in the $n_1$ queue(s), for transmission in accordance with an EDCA transmission protocol, where $n_1$ is an integer smaller than or equal to N, and
a hybrid coordination function (HCF) controlled channel access (HCCA) control unit coupled to $n_2$ of N queues to access channels for the MSDUs stored in the $n_2$ queue(s), for transmission in accordance with an HCCA transmission protocol, where $n_2$ is equal to N, and at least a first of the N queues is a member of the $n_1$ queue(s), as well as a member of the $n_2$ queue(s);
a physical (PHY) layer coupled to the MAC layer; and
one or more substantially omnidirectional antenna(e) coupled to the physical layer of the network interface.

17. The system of claim 16, wherein the mapper of the medium access control (MAC) layer is to map and store voice MAC service data units (MSDUs) in said first of the N queues, that is a member of the $n_1$ queue(s), as well as a member of the $n_2$ queue(s).

18. The system of claim 16, wherein the mapper of the medium access control (MAC) layer is further to map and store video MAC service data units (MSDUs) in a second of the N queues, that is a member of the $n_1$ queue(s), as well as a member of the $n_2$ queue(s).

* * * * *

UNITED STATES PATENT AND TRADEMARK OFFICE
CERTIFICATE OF CORRECTION

PATENT NO. : 7,554,999 B2 Page 1 of 1
APPLICATION NO. : 11/169366
DATED : June 30, 2009
INVENTOR(S) : Ginzburg et al.

It is certified that error appears in the above-identified patent and that said Letters Patent is hereby corrected as shown below:

Column 6
Line 65, "13. ...to physical layer..." should read --13. ...to the physical layer...--.

Column 6
Line 66, "13. ...on the results..." should read --13. ...on the result...--.

Column 7
Line 1, "14. The method of claim of claim 13,..." should read --14. The method of claim 13,...--.

Signed and Sealed this

First Day of June, 2010

David J. Kappos
*Director of the United States Patent and Trademark Office*